(12) United States Patent
Weinstein

(10) Patent No.: US 12,076,692 B1
(45) Date of Patent: Sep. 3, 2024

(54) FLEXIBLE FUEL SYSTEM FOR COMBUSTION ABATEMENT

(71) Applicant: GlobalFoundries U.S. Inc., Malta, NY (US)

(72) Inventor: Justin M. Weinstein, Clifton Park, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 18/533,316

(22) Filed: Dec. 8, 2023

(51) Int. Cl.
*B01D 53/90* (2006.01)
*B01D 53/86* (2006.01)

(52) U.S. Cl.
CPC ......... *B01D 53/90* (2013.01); *B01D 53/8696* (2013.01); *B01D 2251/102* (2013.01); *B01D 2251/11* (2013.01); *B01D 2257/2025* (2013.01); *B01D 2257/2027* (2013.01); *B01D 2257/2042* (2013.01); *B01D 2257/2045* (2013.01); *B01D 2257/2047* (2013.01); *B01D 2257/406* (2013.01); *B01D 2257/553* (2013.01); *B01D 2257/556* (2013.01); *B01D 2258/0216* (2013.01)

(58) Field of Classification Search
CPC ................ B01D 53/90; B01D 53/8696; B01D 2251/102; B01D 2251/11; B01D 2257/2025; B01D 2257/2027; B01D 2257/2042; B01D 2257/2045; B01D 2257/2047; B01D 2257/406; B01D 2257/553; B01D 2257/556; B01D 2258/0216

USPC ........................................................ 423/237
See application file for complete search history.

(56) References Cited

U.S. PATENT DOCUMENTS

| 5,435,836 | A | 7/1995 | Anand et al. | |
|---|---|---|---|---|
| 9,387,428 | B2 | 7/2016 | Clark et al. | |
| 9,856,837 | B2 | 1/2018 | Dunn et al. | |
| 2009/0216061 | A1 | 8/2009 | Clark et al. | |
| 2011/0195367 | A1* | 8/2011 | Constantin | C03B 5/235 431/12 |
| 2022/0016572 | A1* | 1/2022 | Lampert | F23G 5/50 |

FOREIGN PATENT DOCUMENTS

CN 112408325 A 2/2021

* cited by examiner

*Primary Examiner* — Anita Nassiri-Motlagh
(74) *Attorney, Agent, or Firm* — Francois Pagette; Hoffman Warnick LLC

(57) ABSTRACT

A system to abate an emission from a first semiconductor process is disclosed. The system includes an abatement apparatus, such as a gas scrubber, to remove hazardous and toxic gas species from the emission. The abatement apparatus may combust the emission to remove these gas species using a fuel and oxidant. The system includes a fuel assembly fluidly coupled to the abatement apparatus which transmits the fuel from at least one source through the abatement apparatus. The fuel assembly may include a supply tank which contains a volume of fuel, a recovery apparatus which recovers and contains a recovery volume of fuel from a second semiconductor process, and a mass flow controller which may transmit fuel from at least one of the supply tank and the recovery apparatus through the abatement apparatus.

14 Claims, 8 Drawing Sheets

US 12,076,692 B1

FLEXIBLE FUEL SYSTEM FOR COMBUSTION ABATEMENT

BACKGROUND

The present disclosure relates generally to gas abatement systems and, more particularly, to flexible fuel devices and systems for combustion abatement of an emission from a semiconductor process.

Semiconductor processes, such as manufacturing processes, often yield emissions having hazardous and toxic gas species. An abatement system is typically coupled to a semiconductor process to remove, or substantially remove, these gas species from an emission output from the semiconductor process. However, these abatement systems often consume substantial amounts of fuel, such as natural gas, to catalyze a combustion reaction which combusts the emission therein. Conventional abatement systems often are configured to utilize a single fuel type without the ability to switch energy sources. Embodiments of the present disclosure address these shortcomings, among others, in abatement systems.

SUMMARY

All aspects, examples and features mentioned below can be combined in any technically feasible way.

An aspect of the disclosure provides a system including: an abatement apparatus including a combustion chamber configured to abate an emission output from a first semiconductor process; and a flexible fuel assembly coupled to the abatement apparatus and configured to transmit fuel through the combustion chamber which catalyzes a combustion reaction to abate the emission therein. The flexible fuel assembly including: a first fuel source having a first fuel contained therein, a first mass flow controller (MFC) fluidly coupled between the first fuel source and the abatement apparatus, a second fuel source having a second fuel contained therein, and a second MFC fluidly coupled between the second fuel source and the abatement apparatus, where the flexible fuel assembly is configured to transmit at least one of the first fuel and the second fuel through the abatement apparatus to catalyze the combustion reaction.

Another aspect of the disclosure provides a flexible fuel assembly including: a first fuel source having a first fuel contained therein; a first mass flow controller (MFC) fluidly coupled to the first fuel source and configured to transmit the first fuel from the first fuel source through an abatement apparatus; a second fuel source having a second fuel contained therein; and a second MFC fluidly coupled to the second fuel source and configured to transmit the second fuel from the second fuel source through the abatement apparatus, where at least one of the first fuel and the second fuel catalyzes a combustion reaction within a combustion chamber of the abatement apparatus to abate an emission output from a first semiconductor process.

Another aspect of the disclosure provides a method including: transmitting an emission output from a first semiconductor process through a combustion chamber of an abatement apparatus; transmitting at least one of a first fuel and a second fuel from a flexible fuel assembly through the combustion chamber; and catalyzing a combustion reaction with at least one of the first fuel and the second fuel to combust, and thereby abate, the emission output from the first semiconductor process within the combustion chamber. The flexible fuel assembly including a first fuel source having the first fuel therein, a first mass flow controller (MFC) fluidly coupled between the first fuel source and the abatement apparatus, a second fuel source having the second fuel therein, and a second MFC fluidly coupled between the second fuel source and the abatement apparatus.

Two or more aspects described in this disclosure, including those described in this summary section, may be combined to form implementations not specifically described herein. The details of one or more implementations are set forth in the accompanying drawings and the description below. Other features, objects and advantages will be apparent from the description and drawings, and from the claims.

BRIEF DESCRIPTION OF THE DRAWINGS

The embodiments of this disclosure will be described in detail, with reference to the following figures, wherein like designations denote like elements, and wherein.

Figure 1:
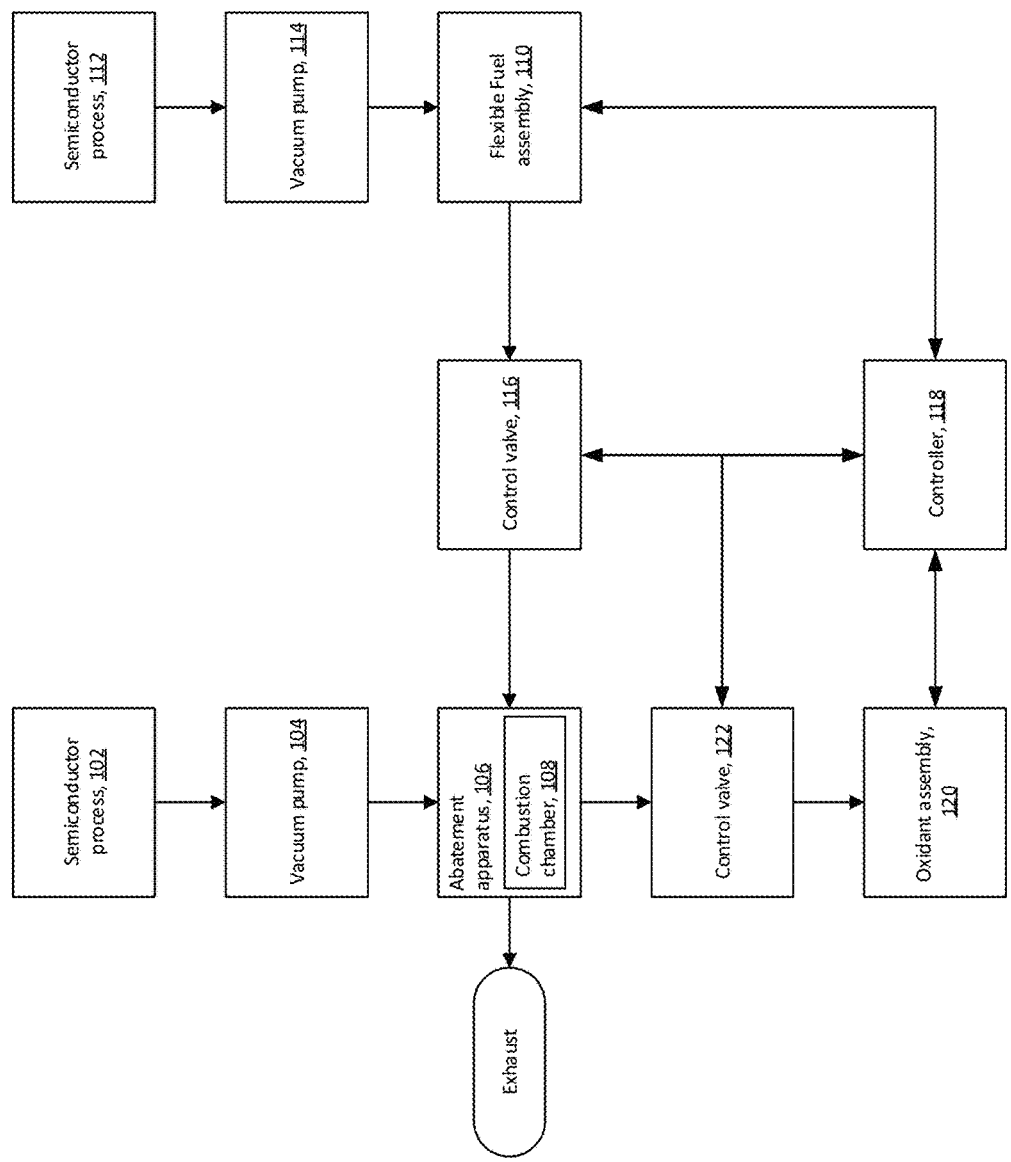
FIG. 1 shows a block diagram of a system for abatement of emissions from a semiconductor process, according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

Embodiments of the disclosure provide an abatement system and related method to remove harmful and toxic gas species (i.e., abate) from an emission which is output from a semiconductor process (e.g., semiconductor manufacturing process). As described herein, the system may include an abatement apparatus coupled to the semiconductor process and configured to abate the emission therein. The system may include a flexible fuel assembly capable of transmitting at least one fuel (e.g., natural gas, propane, hydrogen, etc.) through the abatement apparatus, and which in turn catalyzes a combustion reaction with an oxidant (e.g., oxygen, air) for combusting the emission therein. The flexible fuel assembly may be operatively coupled to a controller configured to control flow of the at least one fuel from the flexible fuel assembly and through the abatement apparatus, as discussed herein.

FIG. 1 shows a block diagram of a system 100 to abate an emission stream, according to embodiments of the disclosure. System 100 includes a semiconductor process 102, including any step or series of steps that involve fabricating, processing, and/or otherwise modifying a semiconductor material, integrated circuit chip, etc. Semiconductor process 102 may yield a hazardous and toxic byproduct, for example an emission including a fluorinated gas, a chlorinated gas, a brominated gas, a hydride gas, or a combination of these gases. In some implementations, semiconductor process 102 yields an emission including substances such as $SiH_4$, $Si_2H_6$, $SiH_2Cl_2$, $Si_2Cl_6$, $GeH_4$, $B_2H_6$, $AsH_4$, $PH_3$, $SiC_8H_{20}O_4$, LTO520, $H_2NSi$, $F_2$, HF, HCl, $Cl_2$, $NF_3$, $NH_3$, $HNO_3$, $TiCl_4$, $BF_3$, $CH_6Si$, $GeF_4$, $BCl_3$, HBr, or a combination of these substances. System 100 may transmit the emission away from semiconductor process 102 and through an abatement device, or combination of abatement devices, configured to remove hazardous and toxic gas species from the emission.

As shown in FIG. 1, system 100 includes a vacuum pump 104 fluidly coupled to semiconductor process 102, which transmits the emission away from semiconductor process 102 through an abatement device as discussed herein. Vacuum pump 104 may include a nitrogen purge (not shown) which provides a volume of nitrogen ($N_2$) to mix with the emission, and which may prevent clogging and/or corrosion of vacuum pump 104. In some implementations, vacuum pump 104 provides a volume of $N_2$ in a range between approximately ten (10) liters per minute and approximately one hundred (100) liters per minute. During operation, combusting $N_2$ within system 100 may catalyze at least one chemical reaction and yield at least one nitrogen-based compound, such as nitric oxide (NO) and/or nitric dioxide ($NO_2$). As further shown in FIG. 1, vacuum pump 104 is coupled to an abatement apparatus 106 for abating the emission from semiconductor process 102 therein using one or more abatement techniques.

Abatement apparatus 106 may include any abatement device, or combination of abatement devices, configured to abate an emission therein using at least one process to remove harmful and toxic gas species from the emission. For instance, abatement apparatus 106 may include a gas scrubber and/or plasma scrubber configured to implement combustion and/or wet scrubbing to abate the emission. In some implementations, abatement apparatus 106 includes a combustion chamber and a water-filled chamber to abate the emission therein via combustion and wet scrubbing abatement techniques, respectively. In some implementations, abatement apparatus 106 receives or otherwise provides an oxidant, or combination of oxidants, for catalyzing a combustion reaction with a fuel, or combination of fuels, and thereby combusting the emission within the combustion chamber. However, it should be understood that other techniques (e.g., other combinations of reactants and/or reactions), ordering of processes, etc., additionally or alternatively may be used by abatement apparatus 106 for abating the emission. In the present embodiment, abatement apparatus 106 includes a combustion chamber 108 configured to abate the emission from semiconductor process 102. Combustion chamber 108 may be configured to receive a fuel, or combination of fuels, to catalyze a combustion reaction with an oxidant, or combination of oxidants, therein. For example, combustion chamber 108 may be configured to receive a fuel (e.g., hydrogen, natural gas, methane, propane, etc.) and an oxidant (e.g., oxygen, air, etc.) therein, which in turn catalyzes a combustion reaction to remove harmful and toxic gas species from the emission. After the combustion reaction, abatement apparatus 106 may release exhaust from combustion chamber 108 (e.g., through an exhaust outlet). In some implementations, the combustion reaction to combust the emission from semiconductor process 102 may include, for example, the following:

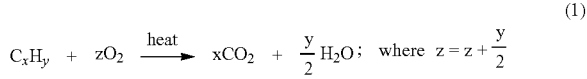

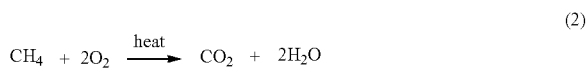

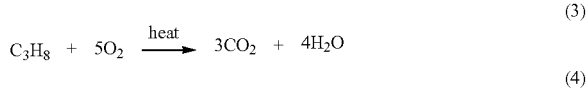

System 100 includes a flexible fuel assembly 110 fluidly coupled to the abatement apparatus 106. Flexible fuel assembly 110 may transmit fuel from a fuel source, or plurality of fuel sources, and through abatement apparatus 106 to catalyze the combustion reaction within combustion chamber 108. Flexible fuel assembly 110 includes a mass flow controller (MFC), or plurality of mass flow controllers, configured to transmit fuel from the fuel source(s) and through abatement apparatus 106. The fuel may include gaseous fuel, such as compressed natural gas, methane, propane, hydrogen, or other fuels that are in a gaseous phase at room temperature and atmospheric pressure. The fuel may be stored in a storage chamber, or plurality of storage chambers, shaped and dimensioned to contain fuel within a pressurized environment. The storage chamber(s) may include a sensor, or combination of sensors, configured to determine a measurable characteristic such as, e.g., pressure, temperature, volume, opacity, purity, etc., due to measurable variations in system 100. For example, a pressure sensor, or plurality of pressure sensors, configured to measure pressure of the fuel contained within the storage chamber(s). These measurements from the sensor(s) may correspond, directly or indirectly, to a variable volume of fuel contained within the storage chamber(s). As further described herein, the sensor(s) may transmit a sensor signal, or combination of signals, to one or more computing devices, such as a controller, configured to actuate flexible fuel assembly 110, and components thereof, in response to the sensor signal(s).

The term "mass flow controller" or "MFC," as used herein refers to a device configured to control a gas and/or liquid at a range of flow rates such that, e.g., at a given setpoint in a range between zero and one hundred percent (0-100%), the MFC will control the rate of flow to the given setpoint. The MFC may include an inlet port, an outlet port, a mass flow sensor, and a proportional control valve. The MFC may be configured to receive signals such as, e.g., input signals from a controller corresponding to a desired setpoint, and adjust the proportional control valve in response to these signals such that the MFC operates at the desired setpoint. The MFC may require that supply gas or liquid (e.g., fuel) be within a specific, operating pressure range based at least in part on the type of fuel and/or operating requirements. The MFC may operate at different setpoints for different types of fuel, which may be due to different heating values, or other fuel properties, dictating a minimum setpoint and/or a maximum setpoint to operate the MFC for respective types of fuel. For example, the MFC may operate at a first minimum setpoint to transmit natural gas, and operate at a second minimum setpoint to transmit hydrogen different than the first minimum setpoint due to a discrepancy in heating values of natural gas and hydrogen. In some implementations, flexible fuel assembly 110 includes a plurality of mass flow controllers which transmit fuel from a respective plurality of fuel sources and through abatement apparatus 106 to catalyze the combustion reaction.

Figure 2:
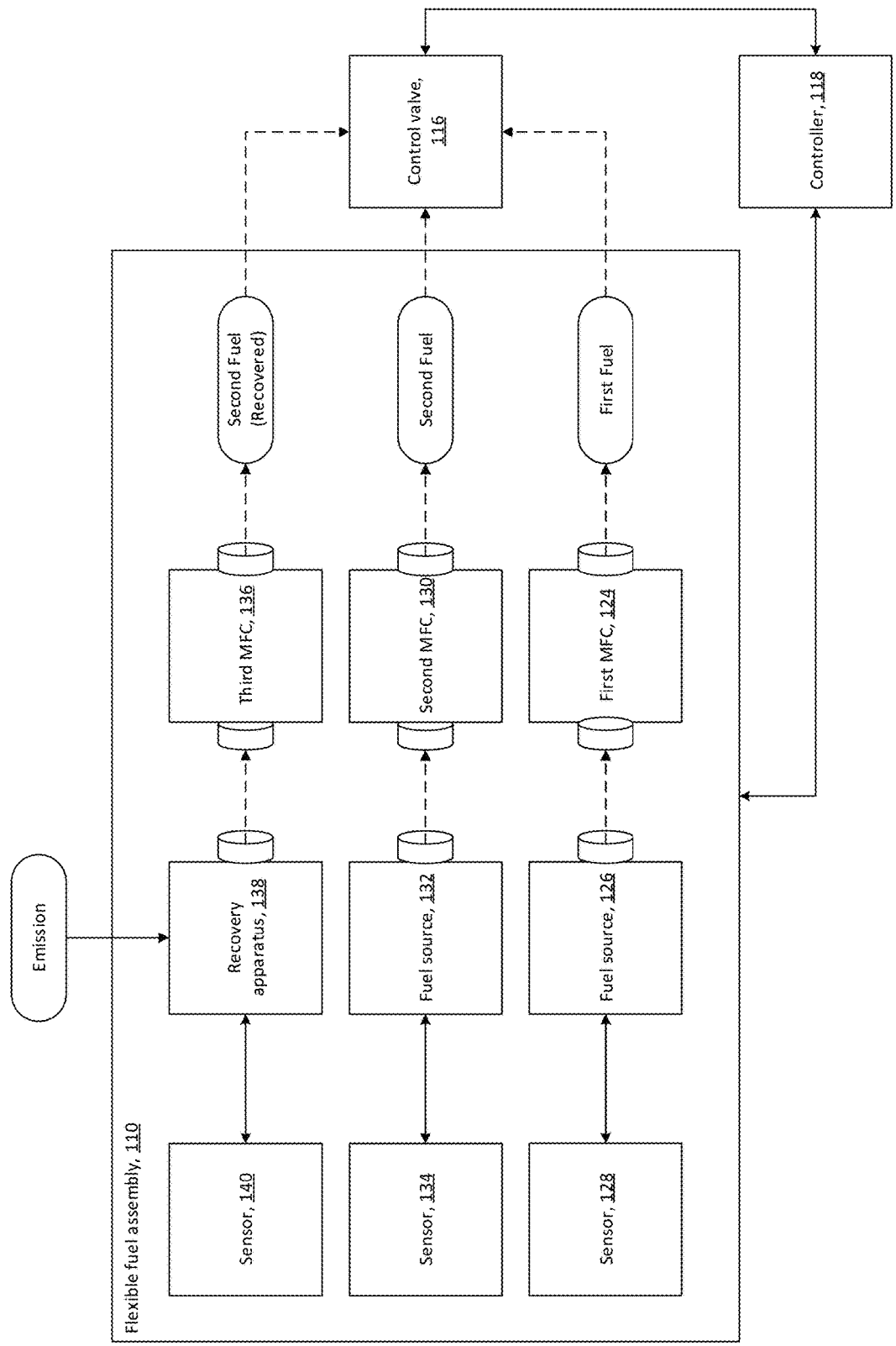
FIG. 2 shows a flexible fuel assembly of the system of FIG. 1.

As shown in FIG. 2, the plurality of mass flow controllers of flexible fuel assembly 110 include a first MFC 124 configured to transmit a first fuel from a fuel source 126, a second MFC 130 configured to transmit a second fuel from a fuel source 132, and a third MFC 136 configured to transmit the second fuel from a recovery apparatus 138. In the present embodiment, the first fuel is methane gas and the second fuel is hydrogen gas such that, e.g., first MFC 124 transmits methane from fuel source 126, second MFC 130 transmits hydrogen from fuel source 132, and third MFC 136 transmits hydrogen from recovery apparatus 138. However other fuels (e.g., propane) may additionally or alternatively be transmitted by flexible fuel assembly 110 to catalyze the combustion reaction.

Fuel source 132 may include a facility supply of first fuel (e.g., methane) which is fluidly coupled to an inlet of first MFC 124 (e.g., via a first supply line). Fuel source 124 may include a storage chamber, or plurality of storage chambers, configured to contain the facility supply of first fuel therein, and to be fluidly coupled with inlet of first MFC 124. First MFC 124 may transmit first fuel from fuel source 126 through an outlet of first MFC 124 which is fluidly coupled to abatement apparatus 106. Similarly, fuel source 132 may include a facility supply of second fuel (e.g., hydrogen) which is fluidly coupled to an inlet of second MFC 130 (e.g., via a second supply line). Fuel source 132 may include a storage chamber, or plurality of storage chambers, configured to contain the facility supply of second fuel therein, and to be fluidly coupled with the inlet of second MFC 130. Second MFC 130 may transmit a second fuel from fuel source 132 through an outlet of second MFC 130 which is fluidly coupled to abatement apparatus 106. In some implementations, fuel source 126 and/or fuel source 132 may be located on-site with, or otherwise in close proximity to, abatement apparatus 106. For example, fuel source 126 may include a storage chamber having natural gas disposed therein which is located at the same semiconductor facility having the abatement apparatus. In other implementations, fuel source(s) 126, 132 may be located off-site at a remote location relative to abatement apparatus 106. For example, fuel source 126 may be remotely located at a first location and fluidly coupled to abatement apparatus 106 at a second location. Moreover, first MFC 124 and second MFC 130 may each include additional components (not shown) disposed therein between respective inlets and outlets such as, e.g., circuits, computing devices, control valves, mass flow sensors, etc. These components enable first MFC 124 and second MFC 130 to respectively transmit the first fuel and the second fuel at a respective setpoint. These components are generally known in the field of mass flow controllers and omitted herein for brevity. Flexible fuel assembly 110 therefore may be configured to transmit the first fuel (e.g., methane) from fuel source 126 through abatement apparatus 106 via first MFC 124, and to transmit the second fuel (e.g., hydrogen) from fuel source 132 through abatement apparatus 106 via second MFC 130.

During operation, abatement apparatus 106 may continuously, or substantially continuously, operate to abate the emission from semiconductor process 102 and therefore continuously requires fuel (e.g., via flexible fuel assembly 110) to catalyze the combustion reaction. System 100 may be configured to alternate between transmitting the first fuel (e.g., methane, propane, etc.) and the second fuel (e.g., hydrogen) from respective fuel sources 126, 132 and/or recovery apparatus 138. As shown, system 100 includes a control valve 116 fluidly coupled between flexible fuel assembly 110 and abatement apparatus 106. Control valve 116 fluidly couples at least one of first MFC 124, second MFC 130, or third MFC 136 with abatement apparatus 106. In some implementations, control valve 116 includes a manual valve to fluidly couple the emission stream to another location in response to the abatement fault. In other implementations, an external device may transmit electrical signals to actuate control valve 116 as discussed herein.

Flexible fuel assembly 110 may include a sensor, or combination of sensors, operatively coupled to system 100 and configured to determine at least one measurable characteristic such as, e.g., pressure, temperature, volume, opacity, purity, etc., due to a measurable variation in system 100. In some implementations, the sensor(s) may be configured to determine a quantity of gaseous fuel in a storage chamber, which can be ascertained by measuring a mass of gaseous fuel therein, measuring the pressure of gaseous fuel in the storage chamber using the sensor(s) and deriving quantity from the measured pressure, and/or by other modeling techniques.

As shown in FIG. 2, flexible fuel assembly 110 may include a sensor 128 operatively coupled to fuel source 126 and configured to determine a volume of first fuel (e.g., methane) contained therein. Sensor 128 may include any sensor, or combination of sensors, configured to determine the volume of first fuel due to a measurable characteristic of system 100. In some implementations, the volume of first fuel is derived from a measurable characteristic, such as pressure or temperature, of first fuel within fuel source 126. Sensor 128 may include temperature sensors, pressure sensors, flow rate meter sensors, or a combination of these sensors. In some implementations, sensor 128 includes at least one flow meter (e.g., electromagnetic flow meter, turbine flow meter, vortex flow meter, ultrasonic flow meter, etc.) to measure a flow rate of the first fuel. For example, sensor 128 may include a first flow meter which measures an in-flow rate of first fuel into fuel source 126 (e.g., increasing volume), and a second flow meter which measures an out-flow rate of first fuel out of fuel source 126 (e.g., decreasing volume). In some implementations, sensor 128 includes at least one temperature sensor (e.g., thermometer, thermocouple, etc.) to measure temperature of the first fuel contained therein. For example, sensor 128 may include a thermometer which measures temperature of the volume of first fuel contained within fuel source 126. In some implementations, sensor 128 includes at least one pressure sensor coupled to fuel source 126 and configured to measure pressure variations of first fuel contained therein. For example, sensor 128 may include a pressure sensor configured to measure pressure of methane within fuel source 126 over a period of time such as, e.g., flexible fuel assembly 110 transmits methane from fuel source 126 through abatement apparatus 106. In some implementations, sensor 128 includes a plurality of sensors that collectively measure a plurality of characteristics of the first fuel, system 100, operating conditions, etc. Moreover, sensor 128 may transmit sensor signals indicating the volume of first fuel (e.g., methane) contained within fuel source 126.

As further shown in FIG. 2, flexible fuel assembly 110 may include a sensor 134 operatively coupled to fuel source 132 and configured to determine a quantity of second fuel (e.g., hydrogen) contained therein. Sensor 134 may include any sensor, or combination of sensors, configured to determine volume of second fuel due to measurable characteristic of system 100. Sensor 134 may include temperature sensors, pressure sensors, weight sensors, flow rate meter sensors, or a combination of these sensors. In some implementations, sensor 134 includes at least one flow meter configured to measure flow rate of the second fuel. For example, sensor 134 may include a first flow meter which measures an in-flow rate of the second fuel into fuel source 132 (e.g., increasing volume), and a second flow meter which measures an out-flow rate of the second fuel out of fuel source 132 (e.g., decreasing volume). In some implementations, sensor 134 includes at least one temperature sensor (e.g., thermometer, thermocouple, etc.) to measure temperature of the first fuel contained therein. For example, sensor 134 may include a thermometer which measures temperature of the volume of second fuel contained within fuel source 132. In some implementations, sensor 134 includes at least one pressure sensor coupled to fuel source 132 and configured to measure pressure variations of second fuel contained therein. For example, sensor 134 may include a pressure sensor configured to measure pressure of hydrogen within fuel source 132 over a period of time such as, e.g., flexible fuel assembly 110 transmits hydrogen from fuel source 132 through abatement apparatus 106. In some implementations, sensor 134 includes a plurality of sensors that collectively measure a plurality of characteristics of the second fuel, system 100, operating conditions, etc. Moreover, sensor 134 may transmit sensor signals indicating the volume of second fuel (e.g., hydrogen) contained within fuel source 132.

System 100 may further include a controller 118 operatively coupled to flexible fuel assembly 110. Controller 118 may receive sensor signals from one or more sensors indicating a characteristic of flexible fuel assembly 110 such as, e.g., the volume of fuel within fuel sources 126, 132 and/or recovery apparatus 138. Controller 118 may be configured to actuate flexible fuel assembly 110 and/or control valve 116 in response to sensor signals. For example, controller 118 may receive sensor signals from sensor 128 and sensor 134 corresponding to the volume of first fuel and volume of second fuel, respectively, and in response to the sensor signals, actuate at least one of first MFC 124 and second MFC 130 to adjust the flow of fuel through abatement apparatus 106. Controller 118 may include any computing device, or combination of computing devices, capable of receiving and transmitting electrical signals to observe, operate, or otherwise engage system 100 and components thereof. Controller 118 may communicate with external devices over a network, such as a wide area network (WAN) and/or local area network (LAN). In some implementations, an external computing device may communicate with controller 118 to exchange information about system 100, operating conditions, etc. In some implementations, an external computing device may transmit electrical signals to controller 118 that correspond to commands for operating system 100. In some implementations, the external computing device provides a graphical user interface (GUI), which enables a user to observe, operate, or otherwise engage system 100 through the external computing device. In some implementations, an external computing device may transmit electrical signals to controller 118 that correspond to commands for operating system 100. In some implementations, the external computing device provides a graphical user interface (GUI), which enables a user to observe, operate, or otherwise engage system 100 through the external computing device.

In some implementations, controller 118 may communicate with control valve 116 in response to sensor signals from at least one sensor of flexible fuel assembly 110. Controller 118 may be configured to actuate control valve 116 in response to sensor signals, which may cause control valve 116 to fluidly couple at least one mass flow controller of flexible fuel assembly 110 with abatement apparatus 106. For example, controller 118 may actuate control valve 116 to fluidly couple first MFC 124 with abatement apparatus 106 in response to sensor signals from sensor 128. In some implementations, controller 118 may be configured to alternate between the first fuel and the second fuel (e.g., via control valve 116) in response to sensor signals from flexible fuel assembly 110 corresponding to the volume of first fuel and/or volume of second fuel therein. For example, controller 118 may actuate control valve 116 to fluidly couple second MFC 130 with abatement apparatus 106 in response to sensor signals indicating the first fuel is insufficient to abate the emission, e.g., due to a low volume of first fuel within fuel source 126, and thereby causes flexible fuel assembly 110 to transmit the second fuel in lieu of the first fuel. In some implementations, controller 118 may transmit electrical signals to flexible fuel assembly 110 corresponding with at least one setpoint (i.e., a target value for flow rate of fuel expressed as a percentage of maximum flow rate capacity in a range between zero and one hundred) for flexible fuel assembly 110 to operate at least one MFC thereof. For example, controller 118 may transmit electrical signals to flexible fuel assembly 110 corresponding to a designated setpoint for transmitting the first fuel (e.g., methane) via first MFC 124.

Moreover, controller 118 may communicate with flexible fuel assembly 110 to fluidly couple third MFC 136 with control valve 116 such that, e.g., recovery apparatus 138 is fluidly coupled with abatement apparatus 106. As shown, third MFC 136 may transmit fuel from recovery apparatus 138 through an outlet of third MFC 136 which is fluidly coupled to abatement apparatus 106.

Recovery apparatus 138 may recover fuel (e.g., hydrogen) from a gaseous emission, which in turn enables third MFC 136 to transmit the recovered fuel through abatement apparatus 106 for combusting the emission output from semiconductor process 102. Flexible fuel assembly 110 therefore may transmit the second fuel (e.g., hydrogen) using at least one of second MFC 130 and third MFC 136 to respectively transmit the second fuel from at least one of fuel source 132 and recovery apparatus 138, through control valve 116, and into abatement apparatus 106.

Recovery apparatus 138 may include any recovery device, or combination of recovery devices, for recovering fuel using at least one technique to remove fuel from an emission output from a semiconductor process 112. Semiconductor process 112 includes any step or series of steps that involve fabricating, processing, and/or otherwise modifying a semiconductor material, integrated circuit chip, etc. Semiconductor process 112 may yield a hazardous and toxic byproduct, for example an emission including a fluorinated gas, a chlorinated gas, a brominated gas, a hydride gas, or a combination of these gases. In some implementations, semiconductor process 112 yields an emission including substances such as $H_2$, $SiH_4$, $Si_2H_6$, $SiH_2Cl_2$, $Si_2Cl_6$, $GeH_4$, $B_2H_6$, $AsH_4$, $PH_3$, $SiC_8H_{20}O_4$, LTO520, $H_2NSi$, $F_2$, HF, HCl, $Cl_2$, $NF_3$, $NH_3$, $HNO_3$, $TiCl_4$, $BF_3$, $CH_6Si$, $GeF_4$, $BCl_3$, HBr, or a combination of these substances. System 100 may transmit the emission away from semiconductor process 112 and through a recovery device, or combination of recovery devices, configured to recover fuel from the emission such as, e.g., recovery apparatus 138. As shown, system 100 includes a vacuum pump 114 fluidly coupled to semiconductor process 112, which transmits the emission away from semiconductor process 112 through recovery apparatus 138.

For instance, recovery apparatus 138 may include a hydrogen recovery device configured to recover hydrogen gas from the emission of semiconductor process 112 such as, e.g., an epitaxy process, which yields the emission transmitted to recovery apparatus 138 via vacuum pump 114 and susceptible to at least one hydrogen recovery technique. In some implementations, semiconductor process 112 is atmospheric such that system 100 does not require or otherwise use vacuum pump 114 to transmit the emission into recovery apparatus 138. In other implementations, semiconductor process 112 includes a plurality of semiconductor processes which collectively yield a plurality of emissions transmitted to recovery apparatus 138 (e.g., via vacuum pump 114) and susceptible to at least one hydrogen recovery technique.

As shown in FIG. 2, which shows an example of recovery apparatus 138 configured to recover hydrogen fuel, according to embodiments of the disclosure. Recovery apparatus 138 may include a recovery chamber configured to receive the emission from semiconductor process 112 therein. Recovery chamber may include an inlet fluidly coupled with vacuum pump 114 and configured to receive the emission therein. Recovery apparatus 138 may be configured to receive one or more reactants therein such as, e.g., water or nitrogen, which drive a chemical reaction to recover hydrogen fuel within the recovery chamber thereof. For example, recovering hydrogen fuel may include one or more membrane diffusion techniques such as, e.g., a pressure swing adsorption technique, to purify and separate hydrogen gas from the emission. However, it should be understood that other techniques (e.g., other combinations of reactants and/or reactions), ordering of processes, etc., additionally or alternatively may be used by recovery apparatus 138 for recovering fuel from the emission. After recovering fuel, waste gas byproducts are released through an outlet of recovery apparatus 138 and the fuel recovered from semiconductor process 112 (e.g., recovered hydrogen fuel) is collected within at least one storage chamber disposed therein.

Recovery apparatus 138 may include one or more recovery sensors 140 operatively coupled to the storage chamber and configured to determine a recovery volume of fuel contained therein. Recovery sensor(s) 140 may include any sensor, or combination of sensors, configured to determine the volume of fuel within recovery apparatus 138, e.g., due to a measurable characteristic of recovery apparatus 138. For instance, sensor(s) 140 may include temperature sensors, pressure sensors, flow rate meter sensors, or a combination of these sensors. In some implementations, sensor(s) 140 includes at least one flow meter (e.g., electromagnetic flow meter, turbine flow meter, vortex flow meter, etc.) to measure flow rate of the recovered fuel. For example, sensor(s) 140 may include a first flow meter which measures an in-flow rate of fuel into the storage chamber(s) (e.g., increasing volume), and a second flow meter which measures an out-flow rate of fuel out of the storage chamber(s) (e.g., decreasing volume). In some implementations, sensor(s) 140 includes at least one temperature sensor (e.g., thermometer, thermocouple, etc.) to measure temperature of the recovered fuel contained therein. For example, sensor(s) 140 may include a thermometer which measures temperature of recovered fuel contained within the storage chamber(s). In some implementations, sensor(s) 140 includes at least one pressure sensor coupled to recovery apparatus 138 and configured to measure pressure variations of fuel contained within the storage chamber(s). The recovered fuel may have a variable pressure which is due, at least in part, to a variable volume of fuel within the storage chamber(s). As recovery apparatus 138 recovers fuel from semiconductor process 112, and thereby increases the variable recovery volume of fuel therein, the variable pressure of recovered fuel simultaneously increases therein. As system 100 consumes recovered fuel such as, e.g., by transmitting recovered hydrogen to abatement apparatus 106, the variable pressure of recovered fuel simultaneously decreases. In some implementations, sensor(s) 140 includes a plurality of sensors that collectively measure a plurality of characteristics of the recovered fuel, recovery apparatus 138, system 100, operating conditions, etc. Moreover, sensor(s) 140 may transmit sensor signals indicating the recovery volume of recovered fuel (e.g., hydrogen) within recovery apparatus 138.

In some implementations, controller 118 may be configured to receive sensor signals from sensor(s) 140 of recovery apparatus 138, and in response to these sensor signals, actuate control valve 116 and/or at least one of MFC 124, 130, 136 as discussed herein. For example, controller 118 may receive sensor signals from sensor(s) 140 corresponding to the volume of recovered fuel within recovery apparatus 138, and in response to the sensor signals, fluidly couple third MFC 136 with control valve 116 for transmitting recovered fuel from recovery apparatus 138 and through abatement apparatus 106.

In some implementations, controller 118 may be configured to instruct flexible fuel assembly 110 to transmit a fuel mixture from two or more sources of fuel and through abatement apparatus 106. For example, controller 118 may be configured to actuate flexible fuel assembly 110 such that a mixture of hydrogen fuel from fuel source 132 and recovery apparatus 138 is transmitted through abatement apparatus 106. In some implementations, controller 118 may specify a fuel-to-fuel ratio and/or a fuel-to-air ratio of the fuel mixture such as, e.g., a ratio of hydrogen from two sources, or a ratio of hydrogen to oxygen. For example, controller 118 may be configured to actuate flexible fuel assembly 110 such that a mixture of hydrogen fuel from fuel source 132 and recovery apparatus 138 is in a fuel ratio of 2:1. The fuel ratio may be based, for example, on sensor measurements corresponding to the volumes of fuel within fuel source 132 and/or recovery apparatus 138. Flexible fuel assembly 110 therefore may be configured to supplement hydrogen fuel recovered by recovery apparatus 138 with hydrogen fuel from fuel source 132.

In some implementations, controller 118 may compute a consumption demand for abatement apparatus 106 over a period of time, and in turn actuate flexible fuel assembly 110 accordingly to ensure a desired supply of fuel over the period. Controller 118 may determine which fuel, or combination of fuels, is desired based on sensor signals from flexible fuel assembly 110 corresponding to volume measurements of available fuel therein. For example, controller 118 may determine a total volume of fuel to be consumed by abatement apparatus 106 over a three hour period and, in response to sensor signals corresponding to volume measurements of available methane and hydrogen, actuate flexible fuel assembly 110 to transmit one of methane or hydrogen fuel over the three hour period. In some implementations, controller 118 may receive sensor signals indicating that an abatement fault in abatement apparatus 106 has occurred due to insufficient fuel, and in turn transition to another fuel or source of fuel to resume abatement.

Figure 3:
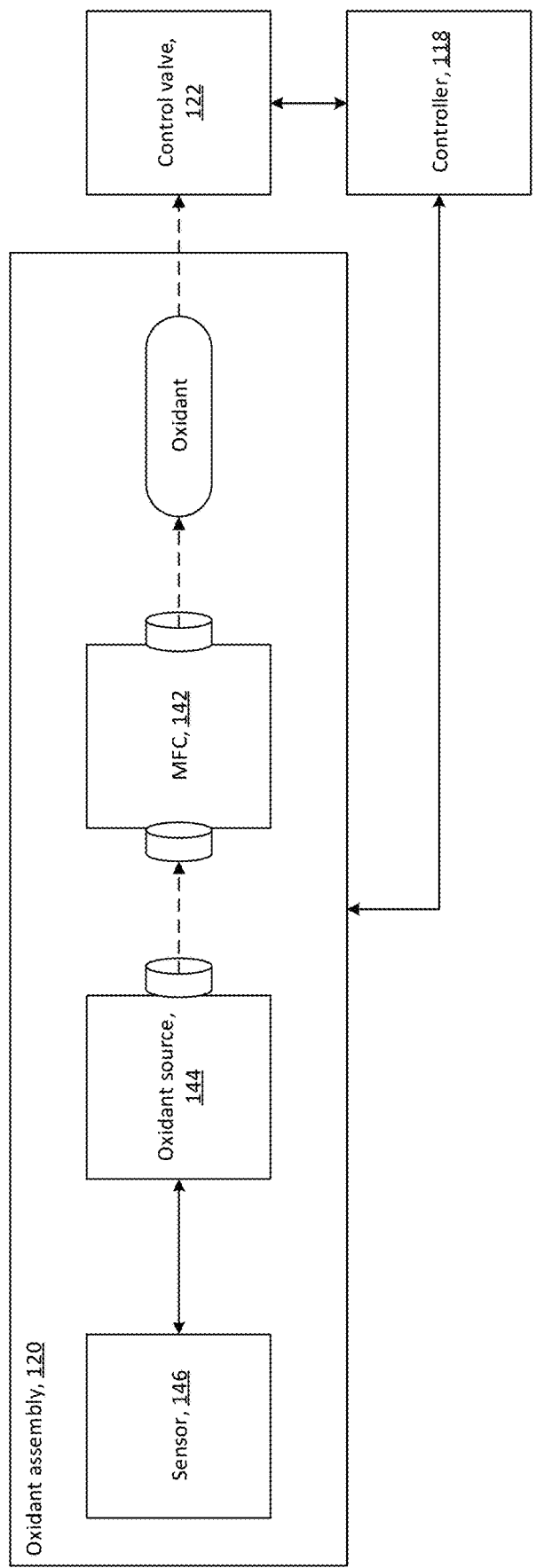
FIG. 3 shows an oxidant assembly of the system of FIG. 1.

As further shown in FIGS. 1 and 3, system 100 may include an oxidant assembly 120 fluidly coupled to abatement apparatus 106. Oxidant assembly 120 may be configured to transmit an oxidant, or combination of oxidants, from an oxidant source 144 having the oxidant(s) contained therein via a mass flow controller (MFC) 142 coupled to oxidant source 144 (FIG. 3). For example, oxidant assembly 120 may transmit oxygen from oxidant source 144 in fluid communication with an inlet of MFC 142 which transmits oxygen (e.g., at a designated setpoint) through abatement apparatus 106 to catalyze the combustion reaction therein. Oxidant source 144 may include a storage chamber, or plurality of storage chambers, having a volume of oxidant contained therein, and fluidly coupled with the inlet of MFC 142 (e.g., via an oxidant supply line). MFC 142 therefore may transmit oxidant from oxidant source 144 through an outlet fluidly coupled with abatement apparatus 106. For example, MFC 142 may transmit oxygen from oxidant source 144 which in turn combusts with fuel (e.g., methane, hydrogen) within combustion chamber 108.

Oxidant assembly 120 may include a sensor, or combination of sensors, operatively coupled to system 100 and configured to determine at least one measurable characteristic such as, e.g., pressure, temperature, volume, opacity, purity, etc., due to a measurable variation in system 100. As shown, oxidant assembly 120 may include one or more sensors 146 operatively coupled to oxidant source 144 and configured to measure a characteristic of oxidant source 144 and/or oxidant contained therein. In some implementations, sensor(s) 146 may include temperature sensors, pressure sensors, flow rate meter sensors, gas sensors or a combination of these sensors. In some implementations, sensor(s) 146 includes at least one pressure sensor coupled to oxidant source 144 and configured to measure pressure variations of oxidant contained therein. For example, sensor(s) 146 may include a pressure sensor configured to measure pressure of oxygen within oxidant source 144 over a period of time such as, e.g., oxidant assembly 120 transmits oxygen from oxidant source 144 through abatement apparatus 106. In some implementations, sensor(s) 146 includes at least one flow meter (e.g., electromagnetic flow meter, turbine flow meter, vortex flow meter, etc.) to measure flow rate of oxidant. For example, sensor(s) 146 may include a first flow meter which measures an in-flow rate of oxidant into oxidant source 144, and a second flow meter which measures an out-flow rate of oxidant out of oxidant source 144. In some implementations, sensor(s) 146 includes at least one temperature sensor (e.g., thermometer, thermocouple, etc.) to measure temperature of the oxidant contained therein. For example, sensor(s) 146 may include a thermometer which measures temperature of the volume of oxidant contained within oxidant source 144. In some implementations, sensor(s) 146 includes a plurality of sensors that collectively measure a plurality of characteristics of the oxidant, oxidant assembly 120, system 100, operating conditions, etc. Moreover, sensor(s) 146 may transmit sensor signals indicating at least one characteristic of the oxidant contained within oxidant source 144.

In some implementations, controller 118 may receive sensor signals from sensor(s) 146 corresponding to at least one characteristic of oxidant assembly 120. In some implementations, controller 118 is configured to control the flow of oxidant and fuel from oxidant assembly 120 and flexible fuel assembly 110, respectively. Controller 118 may be configured to transmit a mixture of fuel and oxidant in response to sensor signals.

In some implementations, system 100 may include a fuel injection device (not shown), or combination of fuel injection devices, configured to inject a mixture of fuel and oxidant. The fuel injection device(s) may be fluidly coupled to the flexible fuel assembly 110, such that the fuel injection device(s) may receive a volume of at least one fuel therein (e.g., methane, hydrogen, etc.), and a volume of at least one oxidant therein (e.g., oxygen). Flexible fuel assembly 110 may be configured to transmit fuel and oxidant at a designated fuel to oxidant ratio. The fuel injection device(s) may be operatively coupled to controller 118, such that fuel injection device(s) may inject the mixture into combustion chamber 108 in response to electrical signals from controller 118. In some implementations, the fuel injection device(s) may be fluidly coupled between control valve 116 and abatement apparatus 106.

Figure 4:
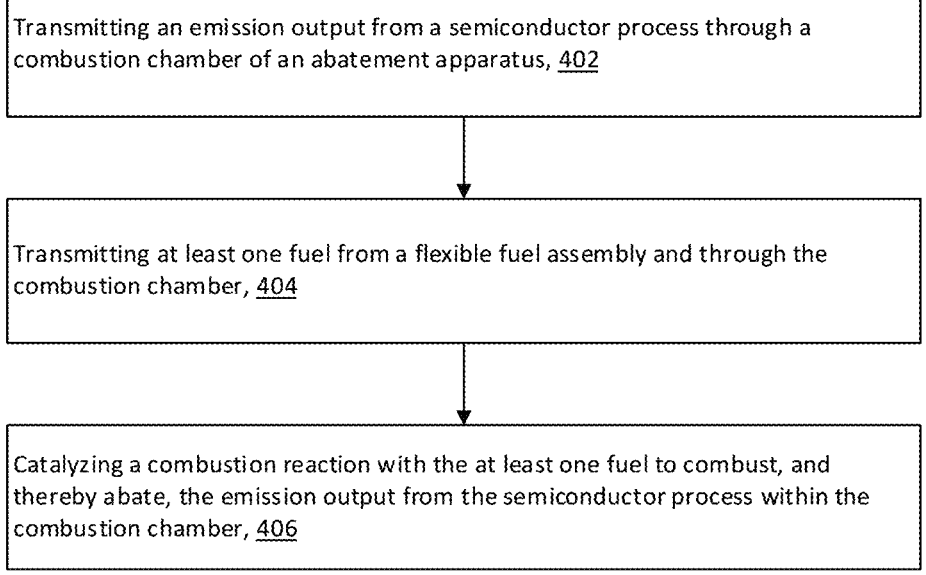
FIGS. 4-8 show illustrative flow diagrams for methods for abatement of an emission stream, according to embodiments of the disclosure.

Referring now to FIG. 4, showing a method 400 to abate an emission according to embodiments of the disclosure. Method 400 may include, but is not limited to, a step or series of steps to abate the emission using system 100 and components thereof as shown in FIGS. 1-3 and discussed herein. At step 402, method 400 may include transmitting an emission output from a semiconductor process through a combustion chamber of an abatement apparatus. For example, transmitting the emission output from semiconductor process 102 through combustion chamber 108 of abatement apparatus 106. At step 404, method 400 may include transmitting at least one fuel from a flexible fuel assembly and through the combustion chamber. For example, transmitting at least one of methane and hydrogen fuel from flexible fuel assembly 110 through combustion chamber 108. At step 406, method 400 may include catalyzing a combustion reaction with the at least one fuel to combust and thereby abate the emission output from the semiconductor process within the combustion chamber. For example, combusting the emission from semiconductor process 102 within combustion chamber 108 with oxidant from oxidant assembly 120 and at least one fuel from flexible fuel assembly 110, and thereby abating the emission.

Figure 5:
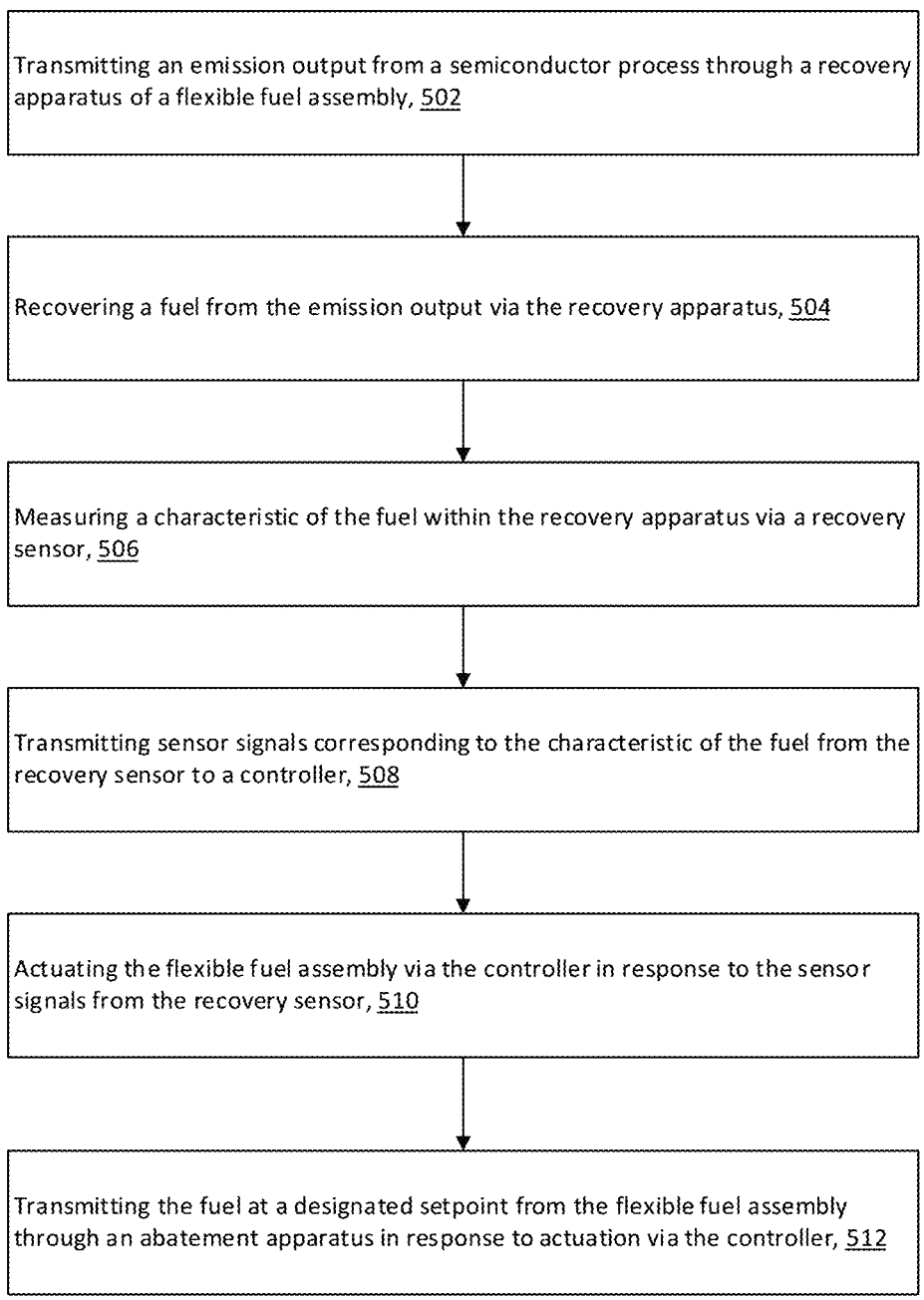

Referring now to FIG. 5, showing a method 500 to abate an emission according to embodiments of the disclosure. Method 500 may include, but is not limited to, a step or series of steps to abate the emission using system 100 and components thereof as shown in FIGS. 1-3 and discussed herein. At step 502, method 500 may include transmitting an emission output from a semiconductor process through a recovery apparatus of a flexible fuel assembly. For example, transmitting the emission output from semiconductor process 112 through recovery apparatus 138 of flexible fuel assembly 110. At step 504, method 500 may include recovering a fuel from the emission output via the recovery apparatus. For example, recovering hydrogen fuel from the emission output from semiconductor process 112 via recovery apparatus 138. At step 506, method 500 may include measuring a characteristic of the fuel within the recovery apparatus via a recovery sensor. For example, measuring a pressure value of hydrogen fuel within recovery apparatus 138 via recovery sensor(s) 140. At step 508, method 500 may include transmitting sensor signals corresponding to the characteristic of the fuel from the recovery sensor to a controller. For example, transmitting sensor signals corresponding to the pressure value of hydrogen fuel from recovery sensor(s) 140 to controller 118. At step 510, method 500 may include actuating the flexible fuel assembly via the controller in response to the sensor signals from the recovery sensor. For example, actuating flexible fuel assembly 110 via controller 118 in response to sensor signals from recovery sensor(s) 140 corresponding to the pressure value of hydrogen fuel within recovery apparatus 138. Actuating flexible fuel assembly 110 may include, for example, transmitting electrical signals from controller 118 to at least one mass flow controller of flexible fuel assembly 110 corresponding to transmission of fuel at a designated setpoint. At step 512, method 500 may include transmitting the fuel at a designated setpoint from the flexible fuel assembly through an abatement apparatus in response to actuation via the controller. For example, transmitting hydrogen fuel at a setpoint of 0.85 percent of maximum flow rate of third MFC 136 from recovery apparatus 138 of flexible fuel assembly 110 through abatement apparatus 106 in response to electrical signals from controller 118 actuating flexible fuel assembly 110.

Figure 6:
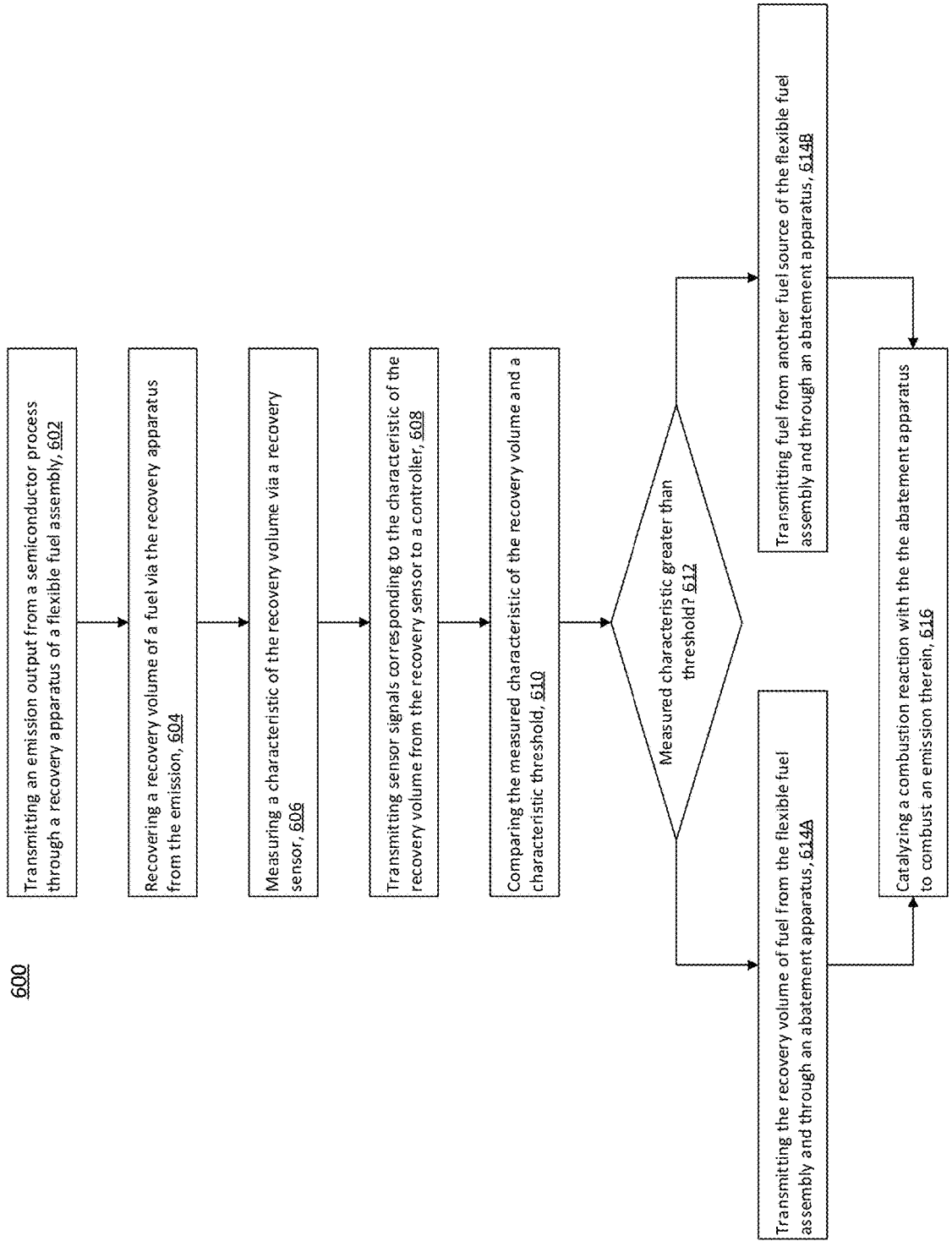

Referring now to FIG. 6, showing a method 600 to abate an emission according to embodiments of the disclosure. Method 600 may include, but is not limited to, a step or series of steps to abate the emission using system 100 and components thereof as shown in FIGS. 1-3 and discussed herein. At step 602, method 600 may include transmitting an emission output from a semiconductor process through a recovery apparatus of a flexible fuel assembly. For example, transmitting the emission output from semiconductor process 114 (e.g., via vacuum pump 114) through recovery apparatus 138 of flexible fuel assembly 110. At step 604, method 600 may include recovering a recovery volume of a fuel via the recovery apparatus from the emission. For example, recovering the recovery volume of hydrogen fuel via recovery apparatus 138 from the emission output from semiconductor process 114. At step 606, method 600 may include measuring a characteristic of the recovery volume via a recovery sensor. For example, measuring a pressure value of hydrogen fuel within recovery apparatus 138 via recovery sensor(s) 140. At step 608, method 600 may include transmitting sensor signals corresponding to the characteristic of the recovery volume from the recovery sensor to a controller. For example, transmitting sensor signals corresponding to the pressure value of hydrogen fuel within recovery apparatus 138 from recovery sensor(s) 140 to controller 118. At step 610, method 600 may include comparing the measured characteristic of the recovery volume and a characteristic threshold. For example, comparing the measure pressure value of hydrogen fuel within recovery apparatus 138 and a pressure threshold. At step 612, if the measured characteristic is greater than the threshold, method 600 proceeds to step 614A and, if the measured characteristic is equal to or less than the threshold, method 600 proceeds to step 614B. At step 614A, method 600 may include transmitting the recovery volume of fuel from the flexible fuel assembly and through an abatement apparatus. For example, transmitting hydrogen fuel recovered by recovery apparatus 138 from flexible fuel assembly 110 via third MFC 136 and through combustion chamber 108 of abatement apparatus 106. At step 614B, method 600 may include transmitting fuel from another fuel source of the flexible fuel assembly and through an abatement apparatus. For example, transmitting at least one of natural gas or hydrogen fuel from first MFC 124 or second MFC 130, respectively, through combustion chamber 108 of abatement apparatus 106. At step 616, method 600 may include catalyzing a combustion reaction within the abatement apparatus to combust an emission therein. For example, combusting the emission from semiconductor process 102 via the combustion reaction including at least one of natural gas or hydrogen fuel from flexible fuel assembly 110, and oxygen from oxidant assembly 120.

Figure 7:
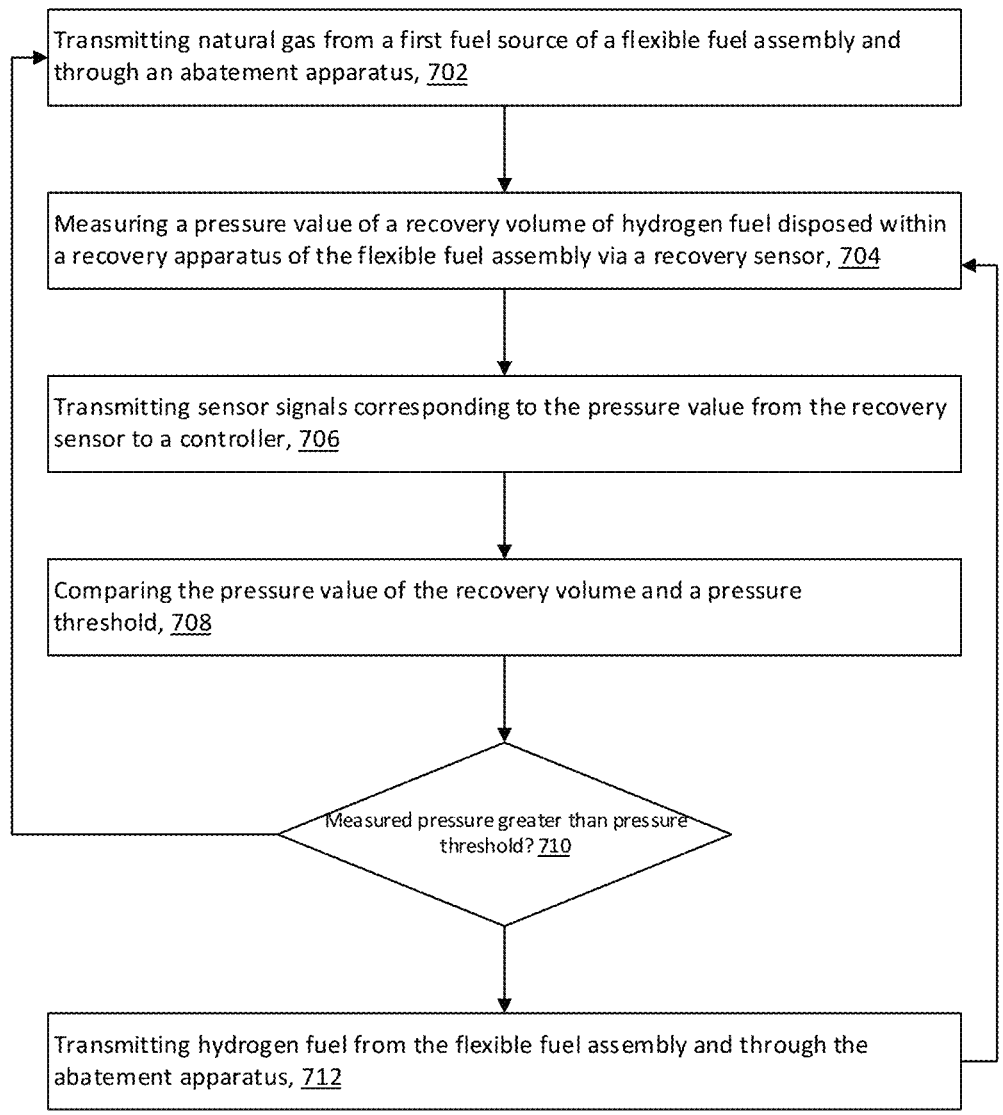

Referring now to FIG. 7, showing a method 700 to abate an emission according to embodiments of the disclosure. Method 700 may include, but is not limited to, a step or series of steps to abate the emission using system 100 and components thereof as shown in FIGS. 1-3 and discussed herein. At step 702, method 700 may include transmitting natural gas from a first fuel source of a flexible fuel assembly and through an abatement apparatus. For example, transmitting natural gas from fuel source 126 of flexible fuel assembly 110 through abatement apparatus 106. At step 704, method 700 may include measuring a pressure value of a recovery volume of hydrogen fuel disposed within a recovery apparatus of the flexible fuel assembly via a recovery sensor. For example, measuring the pressure value of hydrogen fuel within recovery apparatus 138 via recovery sensor(s) 140. At step 706, method 700 may include transmitting sensor signals corresponding to the pressure value from the recovery sensor to a controller. For example, transmitting sensor signals corresponding to the pressure of hydrogen fuel monitored via recovery sensor 138 to controller 118. At step 708, method 700 may include comparing the pressure value of the recovery volume and a pressure threshold. For example, comparing the pressure value of hydrogen fuel within recovery apparatus 138 and a minimum pressure threshold. At step 710, if the measured pressure is less than or equal to the minimum pressure threshold, method 700 may return to step 702 and, if the measured pressure is greater than the minimum pressure threshold, method 700 proceeds to step 712. At step 712, method 700 may include transmitting hydrogen fuel from the flexible fuel assembly and through the abatement apparatus. For example, transmitting hydrogen fuel recovered by recovery apparatus 138 from flexible fuel assembly 110 and through abatement apparatus 108, thereby combusting the emission therein.

Figure 8:
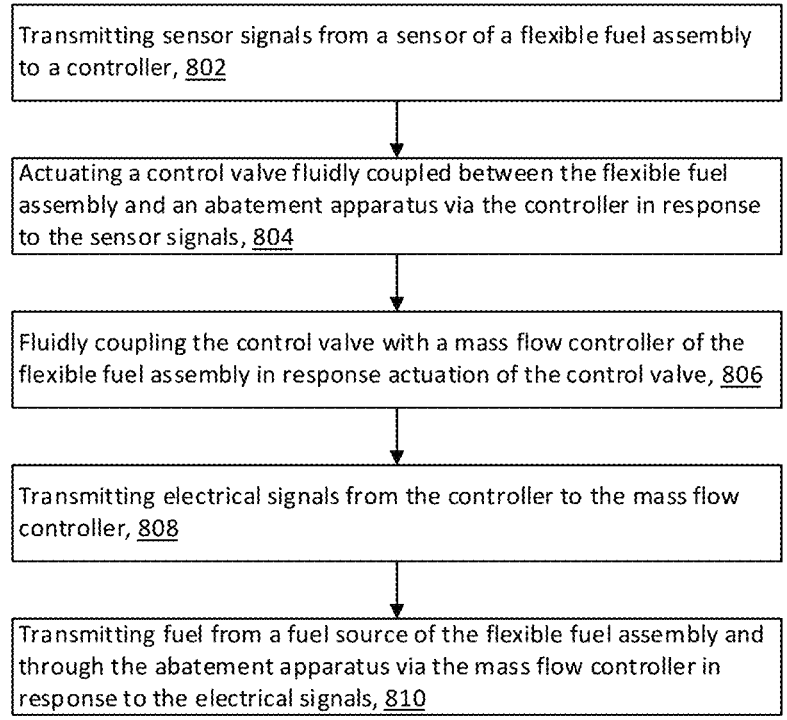

Referring now to FIG. 8, showing a method 800 to abate an emission according to embodiments of the disclosure. Method 800 may include, but is not limited to, a step or series of steps to abate the emission using system 100 and components thereof as shown in FIGS. 1-3 and discussed herein. At step 802, method 800 may include transmitting sensor signals from a sensor of a flexible fuel assembly to a controller. For example, transmitting sensor signals from at least one of sensors 128, 134, 140 of flexible fuel assembly 110 corresponding to at least one characteristic of at least one fuel such as, e.g., natural gas in fuel source 126, hydrogen fuel in fuel source 132, and/or hydrogen fuel in recovery apparatus 138. At step 804, method 800 may include actuating a control valve fluidly coupled between the flexible fuel assembly and an abatement apparatus via the controller in response to the sensor signals. For example, actuating control valve 116 to fluidly couple at least one MFC 124, 130, 136 with abatement apparatus 106 via controller 118. Actuating control valve 116 may include, for example, transmitting electrical signals from controller 118 corresponding to at least one MFC 124, 130, 136, which in turn causes control valve 116 to fluidly couple with respective outlets thereof, and in turn enable flexible fuel assembly 110 to alternate between sources of fuel to catalyze the combustion reaction. At step 806, method 800 may include fluidly coupling the control valve with a mass flow controller of the flexible fuel assembly in response actuation of the control valve. For example, fluidly coupling control valve 116 with first MFC 124 in response to electrical signals from controller 118. At step 808, method 800 may include transmitting electrical signals from the controller to the mass flow controller. For example, transmitting electrical signals from controller 118 to first MFC 124 corresponding to an operating parameter such as, e.g., a designated setpoint of 85% maximum operating flow rate in liters per minute to transmit natural gas from fuel source 126 through abatement apparatus 106. At step 810, method 800 may include transmitting fuel from a fuel source of the flexible fuel assembly and through the abatement apparatus via the mass flow controller in response to the electrical signals. For example, transmitting natural gas from fuel source 126 via first MFC 124 at a setpoint of 0.85 (e.g., 85% maximum operating flow rate in liters per minute) through abatement apparatus 106, which in turn catalyzes the combustion reaction with oxygen from oxidant assembly 120 to combustion the emission from semiconductor process 102 therein.

Embodiments of the disclosure provide various technical and commercial advantages, examples of which are discussed herein. For instance, embodiments of the disclosure may be useful for increasing the availability of fuel to catalyze reactions (e.g., combustion reaction) to abate harmful and toxic gaseous emission from semiconductor processes (e.g., manufacturing process emissions). Embodiments of the disclosure moreover increase the sustainability of abatement process of a first emission by using fuel (e.g., hydrogen fuel) recovered from a second emission. Embodiments of the disclosure may dynamically respond to fuel consumption demands by providing a flexible fuel supply assembly which may provide multiple fuels from multiple sources to abatement devices.

Further technical settings and implementations For purposes of this disclosure, a semiconductor material refers to a material whose conducting properties can be altered by doping with an impurity. Such semiconductor materials include, for example, silicon-based semiconductor materials (e.g., silicon, silicon germanium, silicon germanium carbide, silicon carbide, etc.) and III-V compound semiconductors (i.e., compounds obtained by combining group III elements, such as aluminum (Al), gallium (Ga), or indium (In), with group V elements, such as nitrogen (N), phosphorous (P), arsenic (As) or antimony (Sb)) (e.g., GaN, InP, GaAs, or GaP). A pure semiconductor material and, more particularly, a semiconductor material that is not doped with an impurity for the purposes of increasing conductivity (i.e., an undoped semiconductor material) is referred to in the art as an intrinsic semiconductor. A semiconductor material that is doped with an impurity for the purposes of increasing conductivity (i.e., a doped semiconductor material) is referred to in the art as an extrinsic semiconductor and will be more conductive than an intrinsic semiconductor made of the same base material. That is, extrinsic silicon will be more conductive than intrinsic silicon; extrinsic silicon germanium will be more conductive than intrinsic silicon germanium; and so on. Furthermore, it should be understood that different impurities (i.e., different dopants) can be used to achieve different conductivity types (e.g., P-type conductivity and N-type conductivity) and that the dopants may vary depending upon the different semiconductor materials used.

The structure and method as described above are used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher-level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the disclosure. As used herein, reference in the specification to "one embodiment" or "an embodiment" of the present disclosure, as well as other variations thereof, means that a particular feature, structure, characteristic, and so forth described in connection with the embodiment is included in at least one embodiment of the present disclosure. Thus, the phrases "in one embodiment" or "in an embodiment," as well as any other variations appearing in various places throughout the specification are not necessarily all referring to the same embodiment. It is to be appreciated that the use of any of the following "/," "and/or," and "at least one of," for example, in the cases of "A/B," "A and/or B" and "at least one of A and B," is intended to encompass the selection of the first listed option (A) only, or the selection of the second listed option (B) only, or the selection of both options (A and B). As a further example, in the cases of "A, B, and/or C" and "at least one of A, B, and C," such phrasing is intended to encompass the first listed option (A) only, or the selection of the second listed option (B) only, or the selection of the third listed option (C) only, or the selection of the first and the second listed options (A and B), or the selection of the first and third listed options (A and C) only, or the selection of the second and third listed options (B and C) only, or the selection of all three options (A and B and C). This may be extended, as readily apparent by one of ordinary skill in the art, for as many items listed. It will be further understood that the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not. It will be further understood that when an element such as a layer, region, or substrate is referred to as being "on" or "over" another element, it may be directly on the other element or intervening elements may also be present. In contrast, when an element is referred to as being "directly on" or "directly over" another element, there may be no intervening elements present. It will also be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system comprising:
an abatement apparatus including a combustion chamber configured to abate an emission output from a first semiconductor process; and
a flexible fuel assembly coupled to the abatement apparatus and configured to transmit fuel through the combustion chamber which catalyzes a combustion reaction to abate the emission therein, wherein the flexible fuel assembly comprises:
a first fuel source having a first fuel contained therein,
a first mass flow controller (MFC) fluidly coupled between the first fuel source and the abatement apparatus,
a second fuel source having a second fuel contained therein,
a second MFC fluidly coupled between the second fuel source and the abatement apparatus, wherein the flexible fuel assembly is configured to transmit at least one of the first fuel and the second fuel through the abatement apparatus, and
an oxidant assembly fluidly coupled to the abatement apparatus and configured to transmit an oxidant through the combustion chamber, wherein the oxidant catalyzes the combustion reaction with at least one of the first fuel and the second fuel in the combustion chamber.

2. The system of claim 1, wherein the flexible fuel assembly further comprises:
a recovery apparatus including a recovery chamber configured to recover the second fuel from an emission output from a second semiconductor process;
a third MFC fluidly coupled between the recovery apparatus and the abatement apparatus,
wherein the flexible fuel assembly is configured to transmit the second fuel from at least one of the second fuel source and the recovery apparatus through the combustion chamber.

3. The system of claim 2, further comprising:
a control valve fluidly coupled between the flexible fuel assembly and the abatement apparatus; and
a controller operatively coupled to the control valve and the flexible fuel assembly,
wherein the control valve is configured to fluidly couple at least one of the first MFC, the second MFC, and the third MFC with the abatement apparatus in response to electrical signals from the controller.

4. The system of claim 3, wherein the recovery apparatus comprises:
a storage chamber configured to collect the second fuel therein; and
a recovery sensor operatively coupled to the storage chamber and the controller,
wherein the recovery sensor is configured to measure a characteristic of the second fuel within the storage chamber,
wherein the controller is configured to transmit electrical signals to the control valve in response to sensor signals from the recovery sensor corresponding to the characteristic of the second fuel within the storage chamber.

5. The system of claim 4, wherein the recovery sensor comprises at least one pressure sensor, and wherein the characteristic of the second fuel comprises a variable pressure corresponding to a variable volume of the second fuel within the storage chamber.

6. The system of claim 4, wherein the flexible fuel assembly further comprises:
a first sensor operatively coupled to the first fuel source and the controller, wherein the first sensor is configured to measure a characteristic of the first fuel contained therein; and
a second sensor operatively coupled to the second fuel source and the controller, wherein the second sensor is configured to measure a characteristic of the second fuel contained therein, and
wherein the controller is configured to transmit electrical signals to the control valve in response to sensor signals from at least one of the first and second sensors corresponding to the characteristic of the first and second fuels, respectively, within the first and second fuel sources.

7. The system of claim 3, wherein the flexible fuel assembly is configured to actuate at least one of the first MFC, the second MFC, and the third MFC to respectively transmit at least one of the first fuel and the second fuel at a designated setpoint through the abatement apparatus.

8. The system of claim 7, wherein the controller is configured to transmit electrical signals to the flexible fuel assembly corresponding to the designated setpoint, thereby causing the flexible fuel assembly to transmit at least one of the first fuel and the second fuel at the designated setpoint.

9. The system of claim 1, wherein the first fuel comprises at least one of natural gas and propane, and wherein the second fuel comprises hydrogen.

10. A flexible fuel assembly comprising:
a first fuel source having a first fuel contained therein;
a first mass flow controller (MFC) fluidly coupled to the first fuel source and configured to transmit the first fuel from the first fuel source through an abatement apparatus;
a second fuel source having a second fuel contained therein;
a second MFC fluidly coupled to the second fuel source and configured to transmit the second fuel from the second fuel source through the abatement apparatus; and
an oxidant assembly fluidly coupled to the abatement apparatus and configured to transmit an oxidant through a combustion chamber of the abatement apparatus;
wherein the oxidant and at least one of the first fuel and the second fuel catalyzes a combustion reaction within the combustion chamber of the abatement apparatus to abate an emission output from a first semiconductor process.

11. The flexible fuel assembly of claim 10, further comprising:
a recovery apparatus including a recovery chamber configured to recover the second fuel from an emission output from a second semiconductor process;
a third MFC fluidly coupled between the recovery apparatus and the abatement apparatus,
wherein the flexible fuel assembly is configured to transmit the second fuel from at least one of the second fuel source and the recovery apparatus through the combustion chamber.

12. The flexible fuel assembly of claim 11, wherein the recovery apparatus comprises:
a storage chamber configured to collect the second fuel therein; and
a recovery sensor operatively coupled to the storage chamber and configured to measure a characteristic of the second fuel within the storage chamber,
wherein the recovery sensor is configured to transmit sensor signals to a controller corresponding to the characteristic of the second fuel within the storage chamber,
wherein, in response to sensor signals from the recovery sensor, the controller is configured to actuate a control valve which fluidly couples at least one of the first MFC, the second MFC, and the third MFC with the abatement apparatus.

13. The flexible fuel assembly of claim 12, further comprising:
a first sensor operatively coupled to the first fuel source and the controller,
wherein the first sensor is configured to measure a characteristic of the first fuel contained therein; and
a second sensor operatively coupled to the second fuel source and the controller,
wherein the second sensor is configured to measure a characteristic of the second fuel contained therein, and
wherein the controller is configured to transmit electrical signals to the control valve in response to sensor signals from at least one of the first and second sensors corresponding to the characteristic of the first and second fuels, respectively, within the first and second fuel sources.

14. The flexible fuel assembly of claim 10, wherein the first fuel comprises at least one of natural gas and propane, and wherein the second fuel comprises hydrogen.

* * * * *

UNITED STATES PATENT AND TRADEMARK OFFICE
CERTIFICATE OF CORRECTION

PATENT NO. : 12,076,692 B1
APPLICATION NO. : 18/533316
DATED : September 3, 2024
INVENTOR(S) : Justin M. Weinstein It is certified that error appears in the above-identified patent and that said Letters Patent is hereby corrected as shown below:

In the Specification

Column 4, Line 4 the first equation reads: " $C_xH_y + {}_zO_2 \xrightarrow{heat} {}_xCO_2 + \frac{y}{2} H_2O$; where z=z- $\frac{y}{2}$ "

but it should read: " $C_xH_y + {}_zO_2 \xrightarrow{heat} {}_xCO_2 + \frac{y}{2} H_2O$; where z=x- $\frac{y}{4}$ "

Signed and Sealed this
Third Day of December, 2024

Katherine Kelly Vidal
*Director of the United States Patent and Trademark Office*